United States Patent
Allie et al.

(10) Patent No.: US 7,352,810 B2
(45) Date of Patent: Apr. 1, 2008

(54) CODING PROCESS AND DEVICE FOR THE DISPLAYING OF A ZOOMED MPEG2 CODED IMAGE

(75) Inventors: Stéphane Allie, Saint Armel (FR); André Magras, Saint Grégoire (FR)

(73) Assignee: Thomson Licensing, Boulogne Billancourt (FR)

( * ) Notice: Subject to any disclaimer, the term of this patent is extended or adjusted under 35 U.S.C. 154(b) by 748 days.

(21) Appl. No.: 10/450,014

(22) PCT Filed: Nov. 16, 2001

(86) PCT No.: PCT/EP01/13285

§ 371 (c)(1),
(2), (4) Date: Jun. 6, 2003

(87) PCT Pub. No.: WO02/47393

PCT Pub. Date: Jun. 13, 2002

(65) Prior Publication Data

US 2004/0037355 A1 Feb. 26, 2004

(30) Foreign Application Priority Data

Dec. 7, 2000 (FR) .................................. 00 15901

(51) Int. Cl.
*H04N 7/12* (2006.01)
(52) U.S. Cl. ................................. 375/240.02
(58) Field of Classification Search ................ 348/625, 348/136, 137, 252, 140, 358, 240; 382/266, 382/272, 268, 45, 199, 298, 205, 312, 256, 382/270; 375/240.02, 240.26, 240.12, 240.16
See application file for complete search history.

(56) References Cited

U.S. PATENT DOCUMENTS

| | | | | |
|---|---|---|---|---|
| 5,570,126 A | | 10/1996 | Blahut et al. | .................... 348/7 |
| 5,596,346 A | * | 1/1997 | Leone et al. | ................. 345/667 |
| 5,963,203 A | * | 10/1999 | Goldberg et al. | ............ 715/723 |
| 6,262,763 B1 | * | 7/2001 | Totsuka et al. | ............. 348/135 |
| 6,456,745 B1 | * | 9/2002 | Bruton et al. | ................ 382/298 |
| 6,757,008 B1 | * | 6/2004 | Smith | .......................... 348/143 |

FOREIGN PATENT DOCUMENTS

| | | |
|---|---|---|
| EP | 0 572 277 | 12/1993 |
| JP | 08023483 | 1/1996 |

* cited by examiner

*Primary Examiner*—Anand Rao
*Assistant Examiner*—Behrooz Senfi
(74) *Attorney, Agent, or Firm*—Joseph J. Laks; Paul P. Kiel; Joseph J. Opalach

(57) ABSTRACT

The process is characterized in that, the zoomed image being defined by its horizontal and vertical homothety ratio with respect to the coded image, it performs the following steps:
   calculation of the horizontal and vertical sizes of an initial display rectangle from which would be obtained the sizes of the target display rectangle as defined by the profile and level information by applying the horizontal and vertical homothety ratios,
   storage in the display_horizontal_size and display_vertical_size fields of an MPEG2 video data stream of the horizontal and vertical sizes of the initial display rectangle.

2 Claims, 2 Drawing Sheets

CODING PROCESS AND DEVICE FOR THE DISPLAYING OF A ZOOMED MPEG2 CODED IMAGE

This application claims the benefit under 35 U.S.C. §365 of International Application PCT/EP01/13285, filed Nov. 16, 2001, which claims the benefit of French Patent Application No. 00/15901, filed Dec. 7, 2000.

BACKGROUND OF THE INVENTION

The invention relates to a coding and decoding process and device compatible with the MPEG2 standard for displaying a zoom of a transmitted image. Performing a zoom of an image consists in enlarging or reducing a part of this image. It therefore involves a modification of the horizontal and vertical dimensions of the image part selected for display in zoom mode.

Nowadays, applications based on interactivity necessitate the ability to view images in reduced or magnified form. For example, electronic program guides utilize images of reduced sizes so as to allow display on the screen of ancillary information in OSD form (standing for On Screen Display). Magnification may also be necessary in the case where one wishes to focus the display on a part of the source image.

The process proposed can be used by any type of apparatus utilizing a stream of data coded according to the MPEG2 standard, for example a decoder, a DVD reader/recorder, an Internet box, etc. The transmission of the data may be transmission by satellite, by cable, terrestrial transmission, etc.

MPEG2 compression is not an object-based processing and the decoded image displayed is generally a copy of the coded source image. To achieve a specific display in zoom mode, it is therefore necessary to code the source image such as it must be displayed, that is to say after having performed the zoom on this source image. Thus, the source image, originating for example from a studio providing a video sequence, is processed before the coding and transmission of the video data. The zoom operations are performed on this source image and it is the new "zoomed" image which is coded like the other images of the video sequence. The drawback of such a process stems from the lack of flexibility which it imposes. The zooms to be carried out must be decided on at the time of coding. These zooms can then no longer be modified on receipt of the data, at the decoder level, for example as a function of data or parameters selected by the viewer.

The aim of the invention is to alleviate the aforesaid drawbacks.

SUMMARY OF THE INVENTION

Accordingly, the subject of the invention is a coding process allowing the display of a zoom of an image coded according to the MPEG2 standard, the zoomed image being defined by its horizontal and vertical homothety ratio with respect to the coded image, characterized in that it performs the following steps:

calculation of the horizontal and vertical sizes of an initial display rectangle from which would be obtained the sizes of the target display rectangle as defined by the profile and level information by applying the horizontal and vertical homothety ratios, storage in the display_horizontal_size and display_vertical_size fields of an MPEG2 video data stream of the horizontal and vertical sizes of the initial display rectangle.

According to a variant, the zoomed image being defined by its location in the displayed image in the event of a diminishment or by the part of the coded image to be displayed in the event of a magnification, the above process is characterized in that it also performs the following steps:

calculation of the corresponding position of the centre of the initial display rectangle with respect to the centre of the coded image so as to define a horizontal and vertical offset, storage of an item of information defining the horizontal and vertical offset in the frame_centre_horizontal_offset and frame_centre_vertical_offset fields of the MPEG2 video data stream.

Its subject is also a coding device for implementing the above coding process, characterized in that it comprises a syntax modifier linked to an MPEG coder for modifying the display_horizontal_size and display_vertical_size fields and the frame_centre_horizontal_offset and frame_centre_vertical_offset fields of the MPEG2 data stream originating from the coder, respectively as a function of the amplitude and of the position of the desired zoom.

According to a variant, the above device is characterized in that it comprises an application synchronizer linked to the coder and to the syntax modifier for controlling the syntax modification between two temporal code instants tc0 and tc1 of the MPEG2 data stream corresponding to the images for which the zoom function is desired.

The idea of the invention is to transport a certain number of parameters relating to the zoom of the image in fields defined in the syntax of the binary stream of video data coded according to the video MPEG2 standard. The fields are chosen from among the extensions provided for in the standard. Thus, the coder can dynamically manage the parameters relating to the zoom, that is to say the dimension of the image to be viewed, its location in the image displayed, the part of the coded image to be viewed in zoom mode, doing so without changing the coding parameters such as the horizontal dimension and vertical dimension of the coded image.

DETAILED DESCRIPTION

Figure 1:
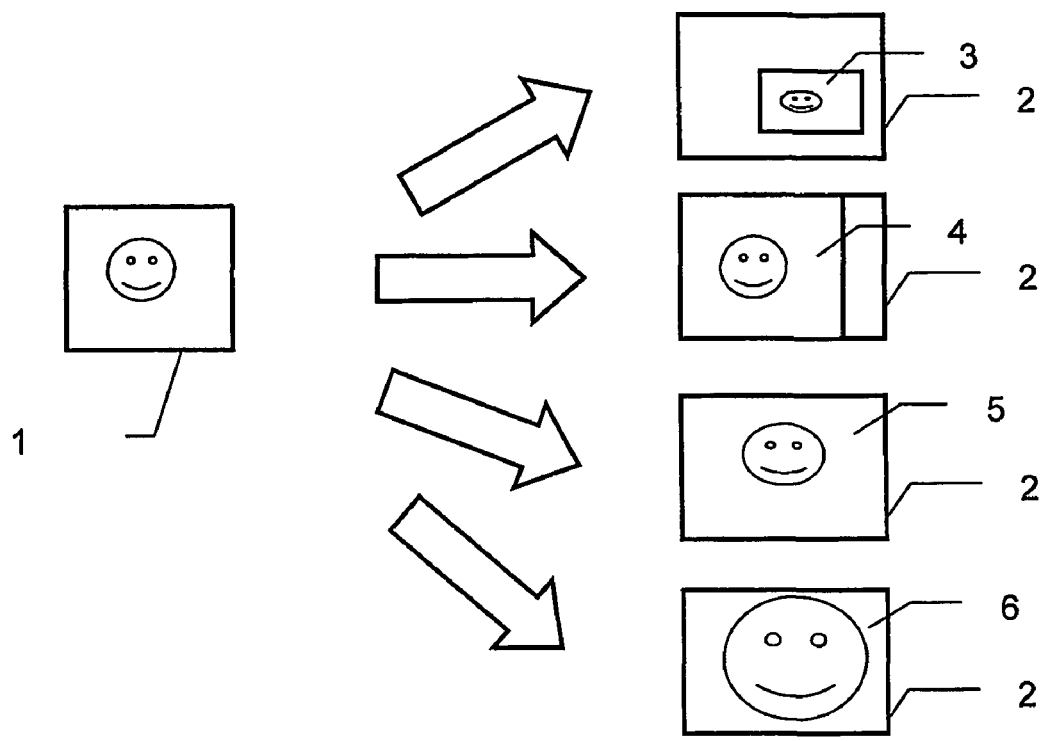
FIG. 1 represents images corresponding to different values of zoom amplitudes.

The various existing fields, in the video MPEG2 standard (ISO/CEI Standard 13818-2), relating to the size of the images to be coded and to be displayed are recalled hereinbelow:

The dimension of the coded image or more exactly of the displayable image is defined in the sequence header of the MPEG2 data stream (paragraph 6.3.3 of the video MPEG2 standard) and optionally in the sequence extension (paragraph 6.3.5 of the video MPEG2 standard).

These are the horizontal_size, vertical_size fields and the horizontal_size_value, vertical_size_value and horizontal_size_extension, vertical_size_extension fields to which the first fields make reference. These fields in fact define the width of the displayable part of the luminance component in pels (pixels) and the height, in terms of number of lines, of the displayable part of the luminance component of the complete image (two-frame) in pels. The displayable image part, which is the image part containing the video and which does not therefore necessarily comprise an integer number of macroblocks, is aligned on the left edge and the upper edge of the coded images.

The dimension of the image displayed is, for its part, defined in the sequence_display_extension (paragraph 6.3.6 of the video MPEG2 standard). It will be noted that this extension does not define the display procedure. The information of this extension has no relevance to the decoding procedure and can be neglected by the decoders in accordance with the MPEG2 specification. The two structures, display_horizontal_size and display_vertical_size, together define a rectangle which may be regarded as being the active region of the envisaged display. If this display rectangle is smaller than the coded two-frame image, then the display procedure may be expected to display only a part of this image. Conversely, if the display rectangle is larger than the coded two-frame image, the display procedure may be expected to display the reconstructed two-frame images only on a part rather than the whole of the display device.

The MPEG2 standard envisages a picture_display_extension structure, the subject of paragraph 6.3.12 of the ISO/CEI document 13818-2. The picture_display_extension makes it possible to offset, picture by picture, the position of the display rectangle, whose sizes are specified by the previously described "sequence_display_extension" structure. One application relates to the reframing of images. The frame_centre_horizontal_offset and frame_centre_vertical_offset fields indicate the horizontal and vertical offset of the centre of the reconstructed image with respect to the centre of the display rectangle. The image centre offsets may serve to implement the full-screen reframing process, by which a rectangular zone corresponding to the full screen is defined and is shifted panoramically over the entire reconstructed image. This process is used in particular to go from an image coded in the 16/9 format to an image displayed in the 4/3 format. The zone defined by the 4/3 format can thus contain the most interesting part of the original 16/9 format image.

It will be noted that the fields which are defined in the standard in respect of a sequence (sequence header, sequence display extension) may in fact be transmitted per picture (cf. reserved values in Table 6.2 of the "identification codes for extension triggering codes" standard).

Amplitude of the Zoom.

The idea proposed here is to regard the information contained in the "display_horizontal_size" and "display_vertical_size" fields as defining the amplitude of a zoom.

Instead of defining, with the aid of these fields, the dimension of the display rectangle or image displayed, as proposed by the MPEG2 standard, one defines a dimension of an "initial display rectangle" or original image from which the zoom would be performed. The dimension of this initial display rectangle is such that the zoom applied to this rectangle gives an image whose dimensions are those of the target display rectangle, that is to say of the dimension of the screen, as defined by the choice of the profile and level by the coder.

Thus, an initial display rectangle of dimensions greater than those of the target display rectangle corresponds to a diminution of the image and a rectangle of smaller dimensions corresponds to a magnification.

The amplitude of the zoom is therefore obtained by calculating the ratio of the size of the target display rectangle, which is deduced from the level and profile information, to the size of the initial display rectangle, which is transported in the "display_horizontal size" and "display_vertical_size" fields. Of course, these latter fields should not be used for the transmission of redundant information concerning the conversion of the 16/9 format into the 4/3 format.

An exemplary use of the fields described above is given below and shown schematically in FIG. 1.

Let us consider a decoded or reconstructed image referenced 1 in the figure, whose dimension is 480 pixels by 576 lines (this is in fact the dimension of the image encoded at the level of the MPEG coder), a target display rectangle or screen dimension referenced 2 of 720 pixels by 576 lines.

The following table indicates the various zoom amplitudes as a function of the information transported in the "display_horizontal_size" and "display_vertical_size" fields.

The values h_zoom and v_zoom correspond to the horizontal and vertical homotheties. A zoom amplitude of less than 1 means that the dimension of the image obtained relative to the reconstructed image, with respect to the dimension of the coded image, is less than 1 and a zoom amplitude of greater than 1 indicates that the dimension of the image obtained with respect to that of the coded image is greater than 1. If this value is equal to 1, then the image obtained is the reconstructed image.

| "Display_horizontal_size" (pixels) | "Display_vertical_size" (lines) | Target display | Amplitude of the zoom h_zoom, v_zoom |
|---|---|---|---|
| 1440 | 1152 | 720 × 576 | h_zoom = 720/1 440 = 0.50<br>v_zoom = 576/1 152 = 0.50<br>*Note 1 |
| 2880 | 2304 | 720 × 576 | h_zoom = 720/2 880 = 0.25<br>v_zoom = 576/2 304 = 0.25<br>*Note 1 |
| 720 | 576 | 720 × 576 | h_zoom = 1<br>v_zoom = 1 |
| 480 | 576 | 720 × 576 | h_zoom = 720/480 = 1.50<br>v_zoom = 576/576 = 1.00<br>*Note 3 |
| 360 | 288 | 720 × 576 | h_voom = 720/360 = 2.00<br>v_zoom = 576/288 = 2.00<br>*Note 2 |
| 180 | 144 | 720 × 576 | h_zoom = 720/180 = 4.00<br>v_zoom = 576/144 = 4.00<br>*Note 2 |

Note 1: Diminution of the image
Note 2: Magnification of the image
Note 3: The image obtained from the coded image, the dimensions of which are greater than those of the coded image, fills the screen.

The target display rectangle (or target display) deduced from the profile and level information and from the image format information (16/9) is greater than the size of the coded image.

The images referenced 3, 4, 5, 6 correspond respectively to the values:

h_zoom=v_zoom=0.50
h_zoom=v_zoom=1.00
h_zoom=1.50, v_zoom=1.00 h_zoom=v_zoom=2.00

The display_horizontal_size and display_vertical_size fields are 14-bit fields. The maximum decimal value, equal to 16 383, corresponds to a maximum diminution of 720/16 383 horizontally and 576/16 383 vertically, in our example.

Location of the Zoomed Image.

The frame_centre_horizontal_offset and frame_centre_vertical_offset fields of the image display extension structure are utilized to transport the zoomed image location information. Same corresponds to the offset of the centre of the coded image with respect to the centre of the initial display rectangle.

The centre of the coded image (in fact of the displayable image) is the centre of the region defined by the "horizontal_size" and "vertical_size" fields of the sequence header.

The centre of the initial display rectangle is the centre of the region defined by the "display_horizontal_size" and "display_vertical_size" fields, as indicated above.

Figure 2:
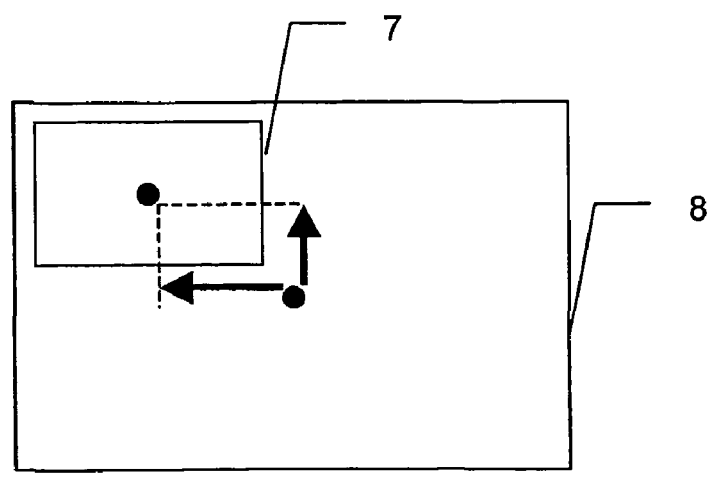
FIG. 2 represents an initial display rectangle for a coded image.

FIG. 2 gives the example of an image diminution and represents an initial display rectangle 8 in which lies the coded image 7 corresponding to the coded image 1. The horizontal and vertical arrows depict the horizontal and vertical offset of the centre of the coded image with respect to the centre of the initial display rectangle.

Let us consider for example a decoded or reconstructed image of size 480 pixels×576 lines, the "display_horizontal_size" and "display_vertical_size" fields respectively transporting the values 1 440 (pixels) and 1 152 (lines) and a size of the target display rectangle of 720 (pixels)×576 (lines).

h_zoom=720/1 440=0.50
v_zoom=576/1 152=0.50

If one wishes to position a zoomed image in the upper left part of the initial display rectangle, for example at a distance of 400 pixels horizontally and 300 lines vertically, from the upper left corner of the initial display rectangle, the offset information will have the following values:
frame_centre_horizontal_offset=(400−1 440/2)×16
frame_centre_vertical_offset=(300−1 152/2)×16

The two values are negative in accordance with the MPEG norm.

The values are multiplied by 16 since the offsets are specified in units of 1/16th of a pel.

The values 400 and 300 correspond to the pre-zoom values of the image. These values must be corrected for the zoom amplitude if one wishes to define the positioning of the zoomed image in the image actually viewed on the screen.

In the case of an image magnification, the position of the initial display rectangle (8) in the coded image (7) defines the zone of the magnified coded image which one wishes to view.

A particular implementation of the invention relates to the dynamic formatting of the video from an interactive application.

Figure 3:
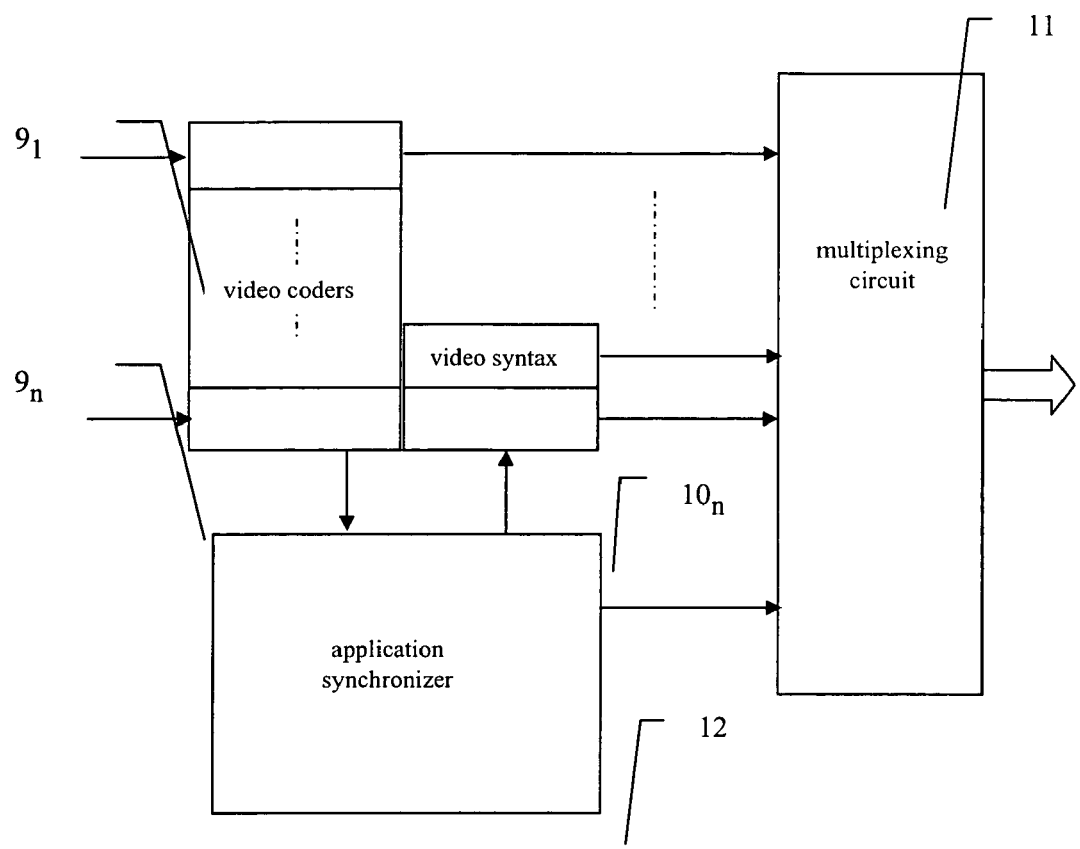
FIG. 3 represents a simplified diagram of the coding device.

FIG. 3 represents a simplified diagram of a device for such an implementation.

The various video source images are received by MPEG2 video coders $9_1$ to $9_n$. The images are coded according to a constant image dimension, for example 720 pixels by 576 lines. Video syntax modification circuits $10_1$ to $10_n$ which are or are not part of the video coders provide interfaces for modifying fields of the MPEG2 video syntax for the associated coders i to n.

A toolbox for the application 12 is composed of:
an application injector, for example in the Open TV, Media Highway, Java format, these being registered trade marks,
an application synchronizer which synchronizes the application with the video for the execution of this application according to the time code information of the MPEG2 elementary stream.

This toolbox 12 receives information originating from the various coders i to n and transmits data for modifying the fields to the syntax modification circuits $10_i$ to $10_n$.

It is linked to a multiplexing circuit 11 for transmitting private data with their PID (Packet IDentifier), in the form of sections.

The various coders $9_1$ to $9_n$, through the video syntax modification circuits $10_i$ to $10_n$ as the case may be, are also linked to the multiplexing circuit 11 which, on the basis of the various elementary streams and private data, provides a transport stream.

This transport stream is then utilized so as to be transmitted to an IRD receiver (standing for Integrated Receiver/Decoder). This receiver, not represented in the figure, comprises, among other things, a decoder for decoding the audio/video data and an application engine for implementing the application package. It may also be a simple means of digital storage such as a hard disk, DVD or the like for subsequent utilization of the recorded data.

The syntax modification circuit 10 modifies basic fields of the MPEG2 video syntax allowing image zooms to be carried out according to the process described above.

In the video stream, these fields are modified over a time space corresponding to the duration of execution of the application. The time codes relating to the initial and final images between which the application is to be implemented at receiver level are transported by the application (private data). This is "start time code" information (tc0) and "stop time code" information (tc1) which therefore correspond to the start and to the end of the application. At the receiver, the application engine extracts the "time code" information for the various data streams and the application is triggered, for a given stream, from the reading of the time code corresponding to tc0, up to the instant tc1 where it stops. Between these two instants, the display is performed in zoom mode.

The application synchronizer 12 receives the time codes of the various coders. It modifies, by way of the syntax modification circuits, the fields of the MPEG2 video syntax, between start time code instant which corresponds to the starting of the application and stop time code instant which corresponds to the end of the application, thus making it possible to reduce (or increase) the size of the video image according to the process described above, for images lying between these instants.

This "start time code" and "stop time code" info can originate from outside data. It is, for example, obtained from the identification of an image sequence during which one wishes to be able to perform a zoom, which sequence is defined by way of these time codes.

In one example, the application supplements the displaying of the diminished image with a display in interactive OSD mode, by inserting information into the image. This interactive mode makes it possible to return to the normal mode, by interrupting the application.

Figure 4:
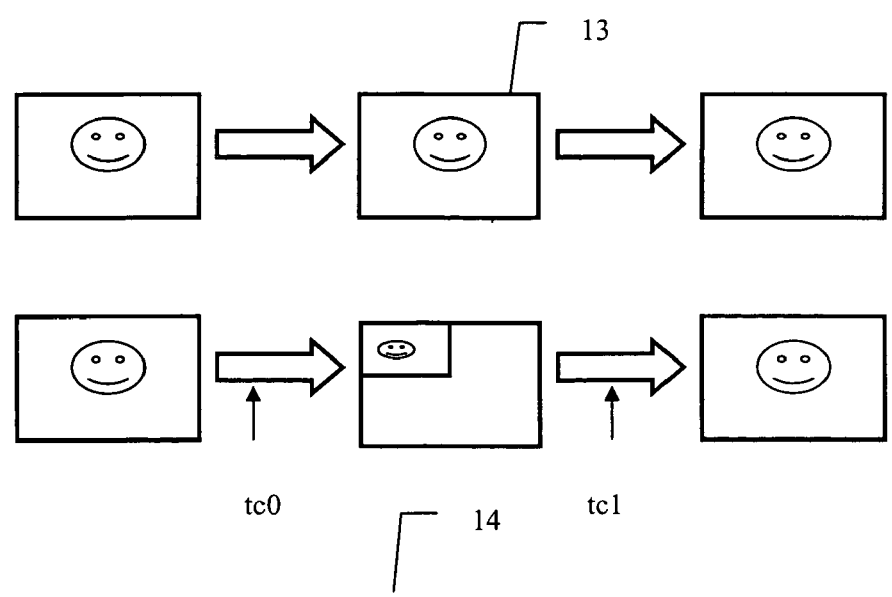
FIG. 4 represents a run of the application between instants tc0 and tc1.

FIG. 4 represents, on a first line, the image 13 as constructed by the coder between the instants tc0 and tc1 during which the application runs, as well as the images preceding the starting of the application and following the end of the application. On a second line are represented the image 14 as displayed by the decoder when the application runs, the image preceding and the image following the application.

Between the instants tc0 and tc1, the application, at the receiver, runs and reduces the size of the image as a function of the data read from the fields defined above.

The MPEG decoder receives the data stream which it decodes in a conventional manner. In particular, the images for which a zoom operation is possible on account of the filling of the fields relating to the amplitude of the zoom and to the position of the zoomed image are decoded so as to provide firstly a reconstructed image whose size is indicated in the "horizontal size" and "vertical size" fields. This reconstructed image is then oversampled or undersampled and then filtered as a function of the amplitude of the zoom so as to obtain the dimension of the image which one desires to display. The position of the imagette (diminishment) or the selection of the image part to be viewed (magnification) are calculated as a function of the data relating to the offset.

An exemplary use may be the insertion of an advert. The image dimension is reduced so as to show up some text. Another example relates to a program guide. In the prior art, the viewer makes a choice on an array constructed at the coder level and the selection of an imagette is manifested by zapping to another video service (elementary video stream).

In the invention, the selecting of a program, for example from an OSD display, triggers the starting of the application for the MPEG data stream corresponding to the selected program. The channel selected is then displayed "live" (in real time) in a window.

The invention claimed is:

1. A coding device comprising:
   an MPEG coder; and
   a syntax modifier linked to the MPEG coder; for modifying the display-horizontal-size and display-vertical-size fields and the frame-centre-horizontal-offset and frame-center-vertical-offset fields of the MPEG data stream originating from the coder, respectively as a function of the amplitude and of the position of a desired zoom,
   wherein the syntax modifier (a) calculates the horizontal and vertical sizes of an initial display rectangle from which is obtained the sizes of a target display rectangle for a scaling ratio of a coded image, (b) stores in the fields display-horizontal-size and display-vertical-size of the MPEG bitstream, the horizontal and vertical size of the initial display rectangle, (c) calculates the corresponding position of the centre of the initial display rectangle with respect to the centre of the coded image so as to define a horizontal and vertical offset, and (d) stores an item of information defining the horizontal and vertical offset in the frame_centre_horizontal_offset and frame_centre_vertical_offset fields of the MPEG video data stream.

2. The device according to claim 1, wherein it comprises an application synchronizer linked to the coder and to the syntax modifier for controlling the syntax modification between two temporal code instants tc0 and tc1 of the MPEG data stream corresponding to the images for which the zoom function is desired.

* * * * *